No. 639,200. Patented Dec. 12, 1899.
J. N. WILSON.
COMBINATION COUPLING AND ANTIRATTLER.
(Application filed Apr. 18, 1899.)
(No Model.)
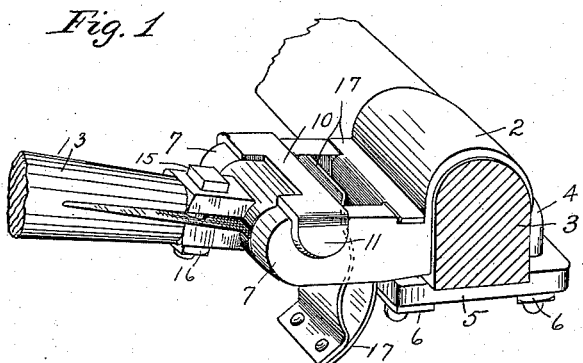
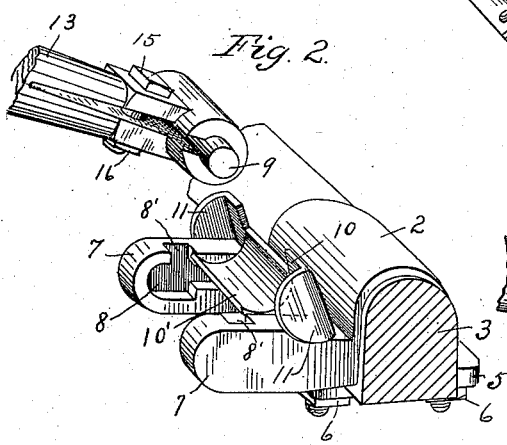
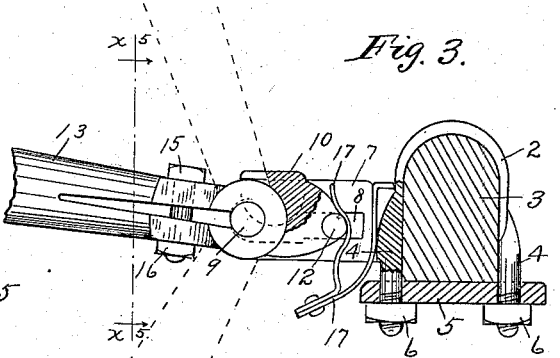
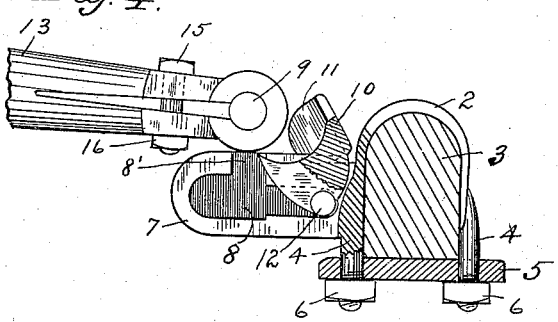
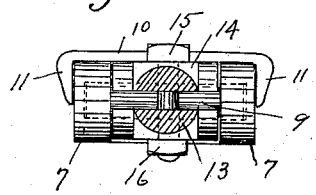
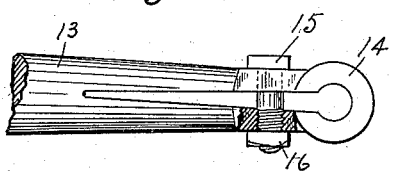

UNITED STATES PATENT OFFICE.

JAMES N. WILSON, OF PIPESTONE, MINNESOTA, ASSIGNOR OF ONE-HALF TO OLIVER H. LEONARD, OF SAME PLACE.

COMBINATION COUPLING AND ANTIRATTLER.

SPECIFICATION forming part of Letters Patent No. 639,200, dated December 12, 1899.

Application filed April 18, 1899. Serial No. 713,456. (No model.)

*To all whom it may concern:*

Be it known that I, JAMES N. WILSON, a citizen of the United States of America, residing at Pipestone, in the county of Pipestone and State of Minnesota, have invented certain new and useful Improvements in a Combination Coupler and Antirattler, of which the following is a specification.

My invention relates to combination couplers and antirattlers for detachably coupling or connecting a pole or shafts to a wagon, buggy, or other vehicle and the embodiment of such device in suitable form to prevent all rattling of the parts of such coupling, and therefore produce a noiseless coupling.

The objects I have in view are to provide means for connecting the pole or shafts of a wagon, buggy, or other vehicle to the front axle thereof and to provide such means of a construction which, while extremely simple and cheap to manufacture, shall be positive and durable and of few parts and wherein rattling of the several parts is positively prevented, producing a noiseless connection, and by the use of which the pole or shaft may be connected or disconnected quickly and easily.

To these ends my invention consists in the constructions, devices, and combinations of parts, all as hereinafter described, and particularly pointed out in the claims, and will be more readily understood by reference to the accompanying drawings, forming a part of this specification, and in which—

Figure 1 is a perspective view of a device embodying my invention. Fig. 2 is a perspective view thereof, showing the positions the respective parts assume when the pole is detached. Figs. 3 and 4 are partial sectional views of my device in the positions shown, respectively, in Figs. 1 and 2. Fig. 5 is a view on the line $X^5 X^5$ of Fig. 3, looking in the direction of the arrow. Fig. 6 is a view of a portion of the end of the pole or shaft brace, showing the binding-bolt, &c.

As shown in the drawings, 2 represents the clip by which my combination coupler and antirattler is secured to the axle 3. This clip may be of the ordinary or any preferred construction, being provided, preferably, with two extensions 4, extending through the binding-plate 5 and having threaded ends upon which the nuts 6 are screwed to firmly hold the clip in place on the axle. Formed integral with this clip are two parallel arms or extensions 7. The inner sides of these arms or extensions 7 are provided with grooves 8, of the forms shown best in Figs. 2 and 4, where it will be seen that the forward portions of these grooves are wider and depressed deeper than the rear portions and that while the forward ends of grooves form a bearing, as hereinafter mentioned, for the pin 9 the grooves extend up a short distance back of the front ends thereof, so as to permit the insertion of the pin 9. A rocker-jaw 10, of the form shown best in Fig. 2, has a semicylindrical portion 10' and two depressed lips or ears 11. This jaw is also provided with two lugs or projections 12, adapted to slide in the grooves 8. The lugs 12 are circular in cross-section to permit pivotal movement of the rocker-jaw 10.

13 represents the end of the brace of the pole or shafts, and is provided with a loop 14. It is split near its end, as shown, to form a spring-bearing about the pin 9. A bolt 15 passes through a suitable hole in one side of the brace and through a threaded opening in the opposite side. To prevent the bolt 15 from working loose, a binding-nut 16 is provided on the outer end of the bolt 15, as shown. It is thus seen that when the pin 9 is slipped into the bearing-loop 14 of the brace and the bolt 15 screwed up to bind the pin 9 in the loop 14 the pin 9 is firmly held thereby and all movement thereof therein prohibited. When the pin 9 has thus been secured in place, as shown in Fig. 2, the ends of the pin 9 are slipped into the portions 8' of the grooves 8, and the end of the brace strikes on the semicylindrical portion of the rocker-jaw 10, which then swings down into the position shown in Fig. 1, the lugs 12 forming the pivots for this action. The ends of the pin 9 then rest in the bottoms of the grooves 8, and the semicylindrical wall of the rocker-jaw 10 bears against the end of the brace. The jaw 10 having thus been slipped forward far enough to completely cover the grooves 8', and thus keep out all dust, the spring 17 is then slipped up between the rear of the jaw 10 and the front wall of the clip 2. This spring is preferably of the form and shape shown best in Fig. 3, where it is seen that it is doubled at its center and that the two ends thereof bear, respectively, against the rear of the jaw and the front wall of the clip 2.

It is thus seen that my coupler is prevented from rattling and that in order to disconnect the pole or shafts it is only necessary to press together the ends of the spring 17, draw it out from between the jaw and clip, throw up the jaw, and pull out the end of the brace and the pin 9 through the grooves 8'.

If it is desired to connect the pole or shaft to a wagon or buggy provided with the old-style clip and connecting-bolt, all that is necessary is to loosen the retaining-nut 16 and set-bolt 15, slip out the pin 9, pass the end of the brace between the outwardly-extending portions of the old-style clip, pass the bolt thereof through the loop 14, screw up the nut thereof, and then tighten up the bolt 15, jamming the loop 14 of the brace tightly against the bolt. It is thus seen that an antirattling connection is made.

In case the retaining-nut on the bolt of the old-style clip works loose and falls off it is obvious that the bolt cannot work loose, as it is firmly fixed in the loop 14 by the setting up of the bolt 15. It is also seen that the ears or lips 11 projecting from the retaining-jaw 10 over the sides of the arms or extensions 7 prevent the arms or extensions 7 from spreading even under the most severe strain.

Having thus described my invention, I claim as new and desire to secure by Letters Patent—

1. The combination, in a device of the class described, with a pole or shaft, of a clip provided with parallel arms or extensions, said arms or extensions each provided with a groove 8 having an extension 8', a rocker-jaw having lugs 12 adapted to rest in said grooves, a pin or bolt carried by the pole or shaft and adapted to be slipped into said grooves 8 through said extensions 8' thereof, said rocker-jaw adapted to be moved up against said pin to prevent its rattling and hold the same in place in said grooves, and a spring adapted to hold said rocker-jaw against said pin, substantially as described.

2. The combination, in a device of the class described, with a pole or shaft, of a clip provided with parallel arms or extensions, said arms or extensions each provided with a groove 8 having an extension 8', a rocker-jaw having lugs 12 adapted to rest in said grooves, said rocker-jaw provided with lugs or ears adapted to prevent said arms or extensions spreading, a pin or bolt carried by the pole or shaft and adapted to be slipped into said grooves 8 through said extensions 8' thereof, said rocker-jaw adapted to be moved up against said pin to prevent its rattling and to hold the same in place in said grooves 8, and a spring adapted to hold said rocker-jaw against said pin, substantially as described.

3. The combination, in a device of the class described, with a pole or shaft, of a clip provided with parallel arms or extensions, said arms or extensions each provided with a groove 8, 8', a rocker-jaw 10, provided with ears 11 and with lugs 12 adapted to rest in said grooves, a pin or bolt carried by the pole or shaft, adapted to be slipped into said grooves 8 through said extensions 8' thereof, said rocker-jaw adapted to be moved up against said pin and prevent its slipping out of said grooves 8, 8' and to prevent its rattling therein, and also adapted to prohibit the entrance of dirt into said grooves 8', 8, and a spring 17 inserted between the rear end of said rocker-jaw and the front wall of said clip and adapted to hold said jaw against said pin and prevent rattling or play between the several parts, substantially as described.

4. The combination, in a device of the class described, of a clip, provided with arms or extensions, said arms or extensions provided with bearings for the bolt or pin of the shaft, a shaft or pole brace provided on its end with a bolt or pin loop and split to form a binding or set collar, and a bolt adapted to be passed through an opening in one side of said split brace and to be screwed into a threaded opening in the opposite side thereof to draw said sides and the walls of said loop together and hold said bolt or pin in said loop, substantially as described.

5. The combination, in a device of the class described, of a clip, provided with parallel arms or extensions, said extensions provided with grooves or channels, a retaining-piece adapted to slide in said grooves, said piece provided with ears or lips adapted to strengthen said arms against spreading, a shaft or pole brace provided with a loop and split to form a binding or set collar, a pin adapted to be passed through said loop and to be inserted into said grooves and retained therein by said retaining-piece, a bolt provided in connection with said split brace whereby the sides thereof may be drawn together to bind said pin in said loop, and a suitable spring provided in connection with said retaining-piece whereby the same is held in position against said pin, substantially as described.

In testimony whereof I have hereunto set my hand, this 10th day of April, A. D. 1899, at Minneapolis, in the county of Hennepin and State of Minnesota, U. S. A.

JAMES N. WILSON.

In presence of—
O. H. LEONARD,
J. R. GODFREY.